United States Patent
Malhotra et al.

(10) Patent No.: US 8,355,334 B2
(45) Date of Patent: Jan. 15, 2013

(54) SPEECH CODEC SELECTION FOR IMPROVED VOICE QUALITY IN A PACKET BASED NETWORK

(75) Inventors: Tanu Malhotra, Schaumburg, IL (US); Anoop Kumar Krishna, Singapore (SG)

(73) Assignee: STMicroelectronics Asia Pacific PTE, Ltd., Singapore (SG)

( * ) Notice: Subject to any disclaimer, the term of this patent is extended or adjusted under 35 U.S.C. 154(b) by 406 days.

(21) Appl. No.: 12/072,817

(22) Filed: Feb. 28, 2008

(65) Prior Publication Data

US 2008/0219244 A1  Sep. 11, 2008

Related U.S. Application Data

(60) Provisional application No. 60/903,945, filed on Feb. 28, 2007.

(51) Int. Cl.
*H04J 1/16* (2006.01)

(52) U.S. Cl. ......................................... 370/252; 370/410

(58) Field of Classification Search .................. 370/252, 370/352, 410, 465, 401, 500, 270, 416
See application file for complete search history.

(56) References Cited

U.S. PATENT DOCUMENTS

| | | | |
|---|---|---|---|
| 6,256,612 B1* | 7/2001 | Vo et al. .......................... | 704/500 |
| 6,373,839 B1* | 4/2002 | Clark et al. .................... | 370/352 |
| 7,307,980 B1* | 12/2007 | Shah .............................. | 370/352 |
| 7,468,992 B2* | 12/2008 | LeBlanc et al. ................ | 370/526 |
| 7,603,474 B2* | 10/2009 | Stern .............................. | 709/232 |
| 2005/0049853 A1* | 3/2005 | Lee et al. ....................... | 704/201 |
| 2006/0171373 A1* | 8/2006 | Li .................................. | 370/352 |
| 2008/0151769 A1* | 6/2008 | El-Hennawey et al. ....... | 370/252 |
| 2008/0212567 A1* | 9/2008 | El-Hennawey et al. ....... | 370/352 |
| 2010/0085887 A1* | 4/2010 | Ray et al. ....................... | 370/252 |

OTHER PUBLICATIONS

The Creation of Global Mobile Communication by Friedhelm Hillebrand 2001 Chapter 14.*

* cited by examiner

*Primary Examiner* — Kibrom T Hailu
*Assistant Examiner* — Dady Chery (57) ABSTRACT

A method of improving voice quality in a packet based network. The method includes receiving an incoming call from a first endpoint and matching capabilities between the first endpoint and the second endpoint. The method also includes completing the incoming call if the capabilities match and tracking the packet loss associated with the network. The method also includes negotiating the voice quality based on the tracking and the capabilities. Also described is a devices and system for a similar method.

21 Claims, 6 Drawing Sheets

| FORWARD LINEAR PREDICTION PLC | PACKET LOSS % | | | | | |
|---|---|---|---|---|---|---|
| | 0 | 5 | 10 | 15 | 20 | 25 |
| VOCODER TYPE | | | | | | |
| G.722 | 4.05 | 3.15 | 2.60 | 2.35 | 2.10 | 1.90 |
| G.723 | 3.70 | 3.25 | 2.80 | 2.10 | 1.90 | 1.80 |
| G.729 | 3.80 | 3.05 | 2.75 | 2.25 | 1.85 | 1.75 |

SPEECH CODEC SELECTION FOR IMPROVED VOICE QUALITY IN A PACKET BASED NETWORK

CROSS REFERENCE TO RELATED APPLICATION

This application claims the benefit of the filing date of U.S. Provisional Patent Application 60/903,945, filed Feb. 28, 2007, which is hereby incorporated by reference.

FIELD OF THE INVENTION

The disclosure relates generally to packet based networks, and in particular to systems and methods of improving voice quality in packet based networks.

BACKGROUND

Without packet loss, delay or jitter in an IP network, Voice over IP (VoIP) calls typically do not suffer from voice degradation problems. The quality of VoIP however, is typically degraded when any delay occurs or if packets are misrouted or lost.

In real-time applications such as, for example, VoIP, a delayed packet is also considered to be a "lost" packet. At the receiver side, the effect of a "lost" packet on the degradation of voice quality can be reduced by an effective packet-loss concealment (PLC) algorithm. For example, one conventional method includes either muting the output speech for the time interval of the missing speech frame or replacing the missing samples in the missing packet with the previous speech frame. Conventional methods, however, can result in distortions which disturb the listener even at low packet loss rates.

Other conventional methods are generally computationally intense and complex. For example, one method generates approximations of the missing speech samples. Other conventional methods use PLC algorithms that are vocoder dependent and are most effective when the missing speech packet is encoded using a particular vocoder. Code Excited Linear Prediction (CELP) based vocoders, for example, have speech parameters such as Linear Prediction coefficients and pitch periods encoded in them. PLC algorithms for these vocoders are typically based on repeating these speech parameters for the missing speech frame.

Still other conventional methods include using high-quality PLC algorithms based on pitch-detection. Some of these methods are used when complying with standards from the International Telecommunication Union (ITU) such as, for example, the G.711 standard, and are can be used with audio compression techniques. In particular, the G.711 standard represents the logarithmic pulse-code modulation (PCM) encoding/decoding standard (as part of Appendix I).

Voice quality may be evaluated using a Mean Opinion Score (MOS) testing technique. The MOS technique employs the use of live listeners and thus is costly and requires a good deal of time to perform. Automated techniques such as, for example, Perceptual Evaluation of the Speech Quality (PESQ), assess voice quality relatively rapidly and at less expense than most MOS techniques.

Regardless of the algorithm used to predict the missing samples, the final objective of most conventional PLC techniques is to improve voice quality.

SUMMARY

According to various embodiments, the present disclosure provides a method of improving voice quality in a packet based network. The method includes receiving an incoming call from a first endpoint. The method also includes matching capabilities between the first endpoint and the second endpoint. The method further includes completing the incoming call if the capabilities match and tracking the packet loss associated with the network. The method further includes negotiating the voice quality based on the tracking and the capabilities.

Also disclosed is an endpoint device comprising a processor and an interface, the endpoint device configured to perform processes as described herein.

Also disclosed is a system comprising a first endpoint device and second endpoint device configured to communicate over a network, the first endpoint configured to perform processes as described herein.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure provides a system and method of achieving voice quality without employing special or proprietary protocol signaling. For example, in one embodiment, the present disclosure provides a Speech Codec Selection process to enhance the voice quality.

Voice quality is conventionally evaluated using existing techniques like MOS, PESQ or PSQM for different vocoders and PLC algorithms. This information is stored as a table and can be used by, for example, a Speech Codec Selection process according to one embodiment of the present disclosure to further enhance voice quality.

In one embodiment, the Speech Codec Selection process does not require any VoIP endpoint to implement any special function or protocol. For example, the endpoints just need to make and receive calls as per the existing Voice over IP standards. In other words, embodiments of the present disclosure may be retrofitted into conventional systems and methods.

Figure 1:
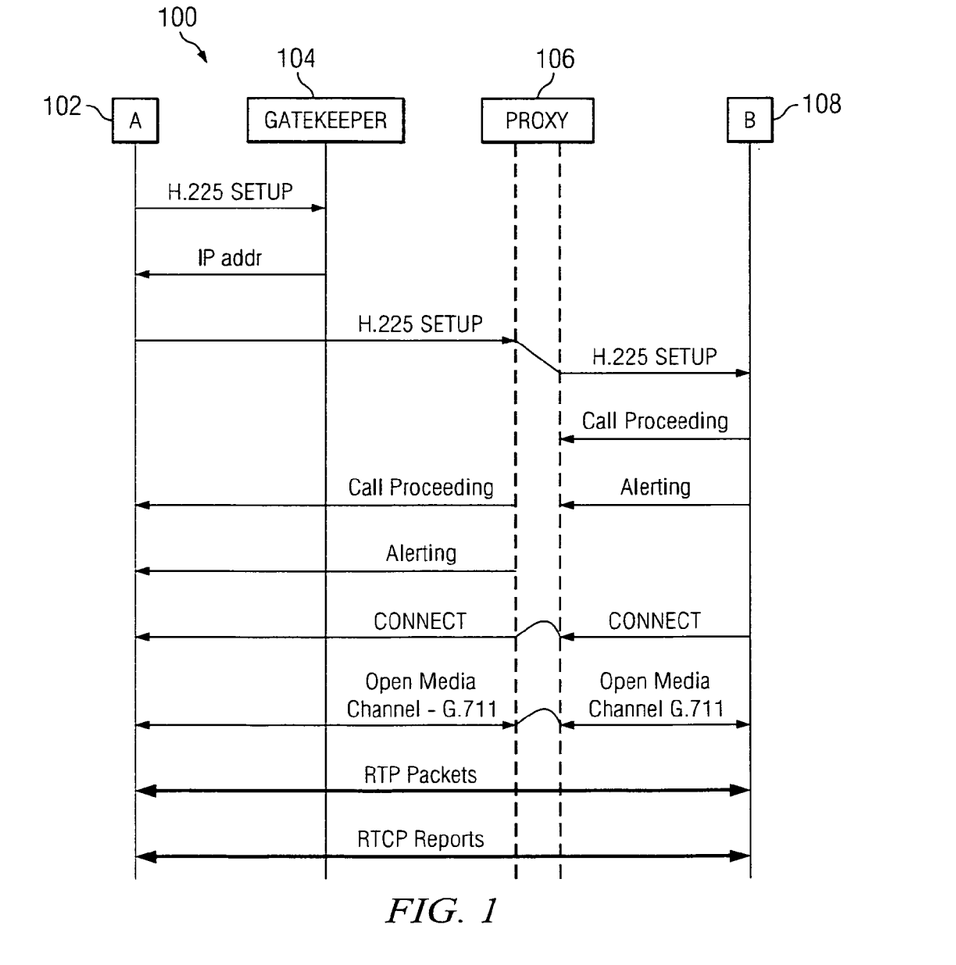
FIG. 1 generally illustrates a conventional VoIP call message flow using H.323 Protocol Signaling.

FIG. 1 generally illustrates a normal call flow 100 for a VoIP call using International Telecommunication Union (ITU) H.323 protocol signaling between Endpoint A 102, gatekeeper 104, proxy 106 and Endpoint B 108. Generally, Endpoint A calls Endpoint B and sends a "Setup" message to initiate the call. In a "Setup" message, Endpoint A also informs Endpoint B of the various media capabilities supported by Endpoint A. Endpoint B upon receiving "Setup" message responds with "Call Proceeding" message 116 and "Alerting" message. Assuming that Endpoint B answers the call and it has matching media capabilities as Endpoint A, Endpoint B sends a "CONNECT" message to Endpoint A. In the "CONNECT" message, Endpoint B informs Endpoint A of the matching media capability that needs to be opened for communication. On receiving the "CONNECT" message, both Endpoint A and Endpoint B open the common media channels and bi-directional flow of RTP Packets and RTCP Reports is established.

Figure 2:
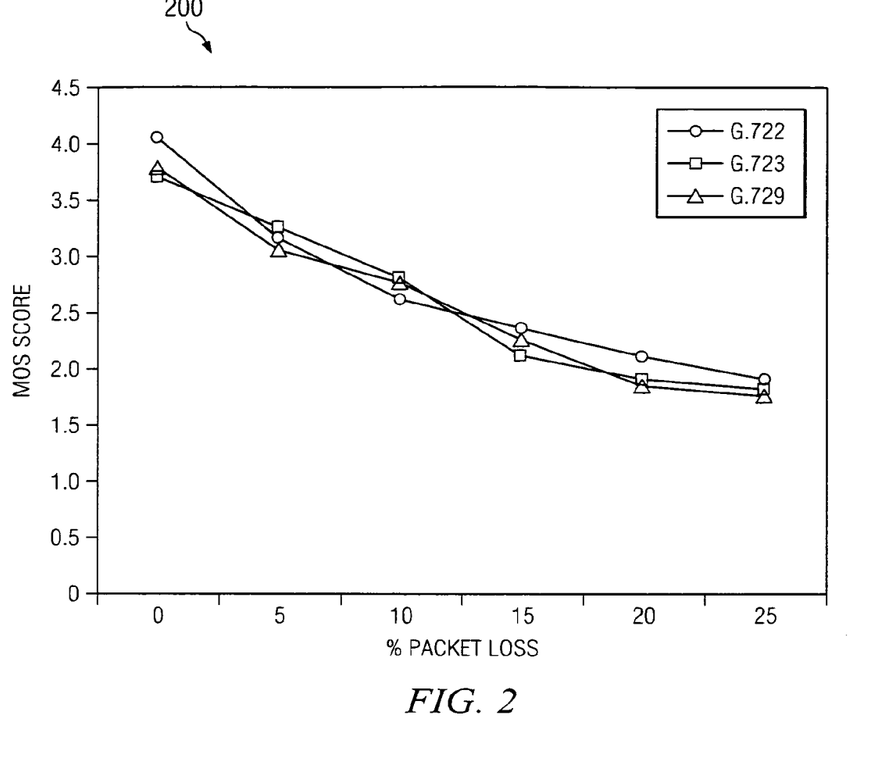
FIG. 2 graphically illustrates the PESQ score achieved for different vocoders for different percentages of packet loss while keeping the PLC algorithm constant.

FIG. 2 depicts plot 200 illustrating PESQ scores achieved for different vocoders for different percentage of packet loss while keeping the PLC algorithm constant. In particular, FIG. 2 depicts the result from a simulation performed using forward-backward linear prediction process for different vocoders and packet loss conditions.

As is evident from FIG. 2, for 10% packet loss and forward-backward linear prediction process, the PESQ score for vocoder G.723>G.729>G.722 whereas for 15% packet loss, the PESQ score for vocoder G.723<G.729<G.722. Thus, for 10% packet loss conditions its better to use G.723 vocoder instead of G.722 whereas for 15% packet loss condition its better to use G.722 vocoder, if the system supports wideband codec, instead of G.723. Else, if the system supports only narrowband codec, G.729 is used. The tabular representation of the simulation depicted in FIG. 2 is depicted in table 300 shown in FIG. 3.

Figure 4:
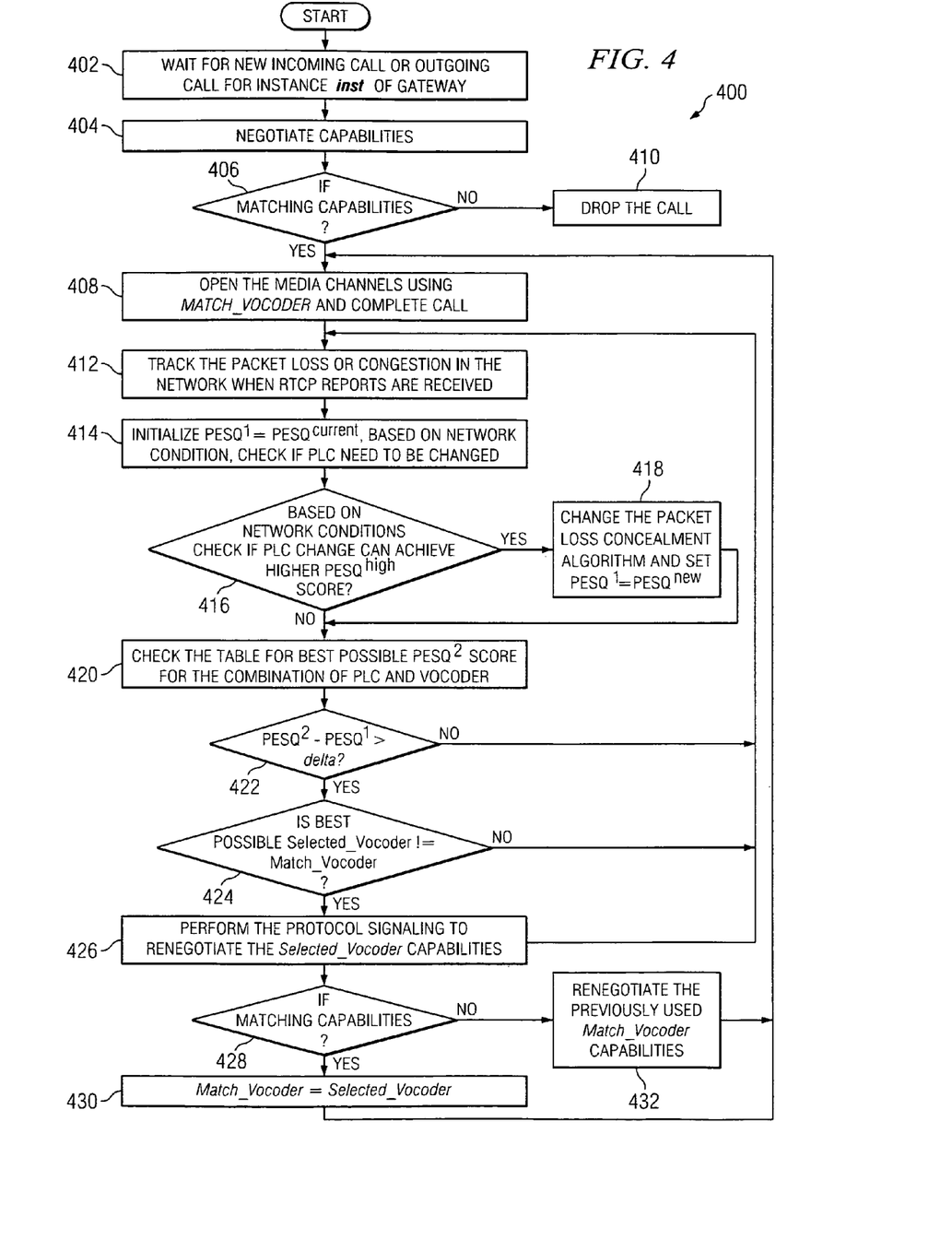
FIG. 4 is a somewhat simplified flow diagram illustrating an exemplary system and method for a VoIP terminal to choose the best vocoder and packet loss concealment to enhance voice quality according to one embodiment of the present disclosure.

FIG. 4 is a somewhat simplified flow diagram illustrating a system and method 400 for a VoIP terminal to choose the best vocoder and packet loss concealment to enhance voice quality according to one embodiment of the present disclosure. In particular, FIG. 4 depicts the overall Codec Selection process implemented in the Voice over IP (VoIP) terminal.

When the VoIP terminal initiates an outgoing call or receives an incoming call in step 402, the terminal begins negotiating the vocoder capabilities in step 404. These vocoder capabilities are usually configured by the user in the order of preference before initiating or receiving a VoIP call. If there is matching capability between the local and remote terminals in step 406, then media channels are opened by starting the RTP and RTCP sessions using MATCH_VO-CODER in step 408. If there are no matching capabilities between the local and remote terminals, the call is dropped in step 410.

When the RTP/RTCP packets are exchanged and tracked between the local and remote terminal in step 412, the voice can be heard on both sides. On the assumption that there will not be any packet loss in the network, the Packet Loss Concealment (PLC) algorithm with lowest computational complexity is chosen in steps 414 by, for example, simply replacing the lost speech samples with the last received samples. Here, $PESQ^1$-$PESQ^{current}$.

Referring to FIG. 1, the normal call flow for a VoIP call using H.323 protocol shown where a RTCP session, RTCP Sender Report (SR) is sent from the active sender to inform about the transmission and reception statistics whereas the RTCP Receiver Report (RR) is sent by the non active senders to inform about the reception statistics. RFC 1889 explains how RTCP reports can be used to estimate the packet loss.

Figure 3:
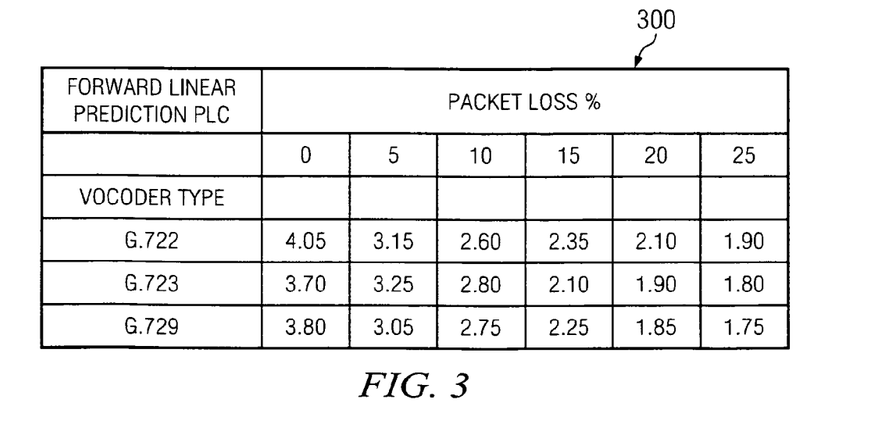
FIG. 3 illustrates exemplary voice quality (PESQ) scores for different vocoders under different packet loss conditions while keeping the Forward Linear Prediction Coefficient PLC algorithm constant.

The VoIP terminal using a Codec Selection process according to one embodiment of the present disclosure, should construct a table of MOS Scores for the voice quality, when a particular voice codec and PLC algorithm is used under varying packet loss conditions in step 410. One such table, resulted from a simulation is depicted in FIG. 3. Keeping the Forward Linear Prediction Coefficient PLC algorithm fixed, different vocoders provide different voice quality (PESQ scores) under different packet loss conditions.

In the similar manner, for every PLC algorithms supported by the VoIP terminal, a similar table can be constructed. In one embodiment, even though no simulation is performed, one PLC algorithm performs better than the other one for different packet loss rate and it is included in the Codec Selection process for the sake of completion.

The VoIP terminal waits for the RTCP Reports from the remote terminal and updates the packet loss rate continuously in step 414. For a particular packet loss rate, another PLC algorithm may perform better than the one currently used in step 414. If that is the case, the most appropriate Packet Loss Concealment (PLC) algorithm to achieve maximum possible $PESQ^1$ Score is selected in step 418. Since the change of PLC algorithm does not have any effect on the remote terminal, there is no need to perform any protocol signaling to inform the remote terminal about it.

After selecting the PLC algorithm, the tables already constructed and stored can be referred to select the combination of PLC algorithm and Vocoder that provides the highest possible $PESQ^2$ score in step 420.

If $PESQ^2$-$PESQ^1$ is greater than the user configurable threshold value 'ə' in step 422, then determine if the best possible selected vocoder is different than the current vocoder in step 424. If $PESQ^2$-$PESQ^1$ is greater than the user configurable threshold value 'ə' in step 422, then return to step 412.

if the best possible selected vocoder is different than the current vocoder, in step 424, then the protocol signaling (H.323/SIP/MGCP) is performed to renegotiate the selected vocoder in step 426, otherwise return to step 412. In the simulation performed, a value of ə=0.25 is used. The user should configure and mitigate the threshold value keeping in view that a low value of threshold may lead to frequent changing of the used vocoder and a high threshold value may lead to no change in the used vocoder.

If the remote terminal also supports the selected vocoder in step 428, then already opened media channels are modified to use the selected vocoder in step 430. If the matching capability is not available with the remote terminal, then the currently used vocoder is renegotiated and no modifications are done to the already opened media channels in step 432 and renegotiation occurs beginning with step 408. The process shown in FIG. 4 can be represented or implemented by the following pseudo code:

The user sets the Vocoder Capabilities in the order of priority or preference; if (New Incoming Call or New Outgoing Call for Instance "inst")

```
{
    Negotiate Vocoder Capabilities with Remote Terminal;
    If( Matching Capabilities )
    {
        Open the Media Channels with Match_Vocoder;
        Start RTP Receive And Transmit Sessions;
        Start the RTCP Sender and Receiver Reports (RR);
        Use the lowest Complexity Curr_PLC Packet Loss
        Concealment Algorithm (PLC);
        while (RTCP Reception Statistics Received)
        {
            Process the received RTCP Report to estimate the
packet_loss;
            If ( UserSetTimeFrame is Over )
            {
                For the Match_Vocoder, Choose the best
Selected_PLC algorithm
                That results in highest possible MOS Score PESQ$^1$)
for the estimated
                packet_loss;
                If (Selected_PLC ! = Curr_PLC)
                {
                    Change the PLC algorithm;
                }
```

Referring to the Table (FIG. 6), search for the best combination of

```
            Selected_Vocoder and Selected_PLC that results in
            MOS score PESQ$^2$
            If  (PESQ$^2$  −   PESQ$^1$  > threshold value 'ə')
            {
            If(Selected_Vocoder != Match_Vocoder)
            {
                Perform the Protocol Signaling to
                Renogotiate Selected_Vocoder;
            }
            If( Matching Capabilities )
            {
                Match_Vocoder = Selected_Vocoder ;
                Modify the Opened the Media Channels with
            Match_Vocoder ;
            }
            else
            {
                Perform the Protocol Signaling to
            Renogotiate Match_Vocoder;
            }
            }
            }
    }
}
```

Figure 5:
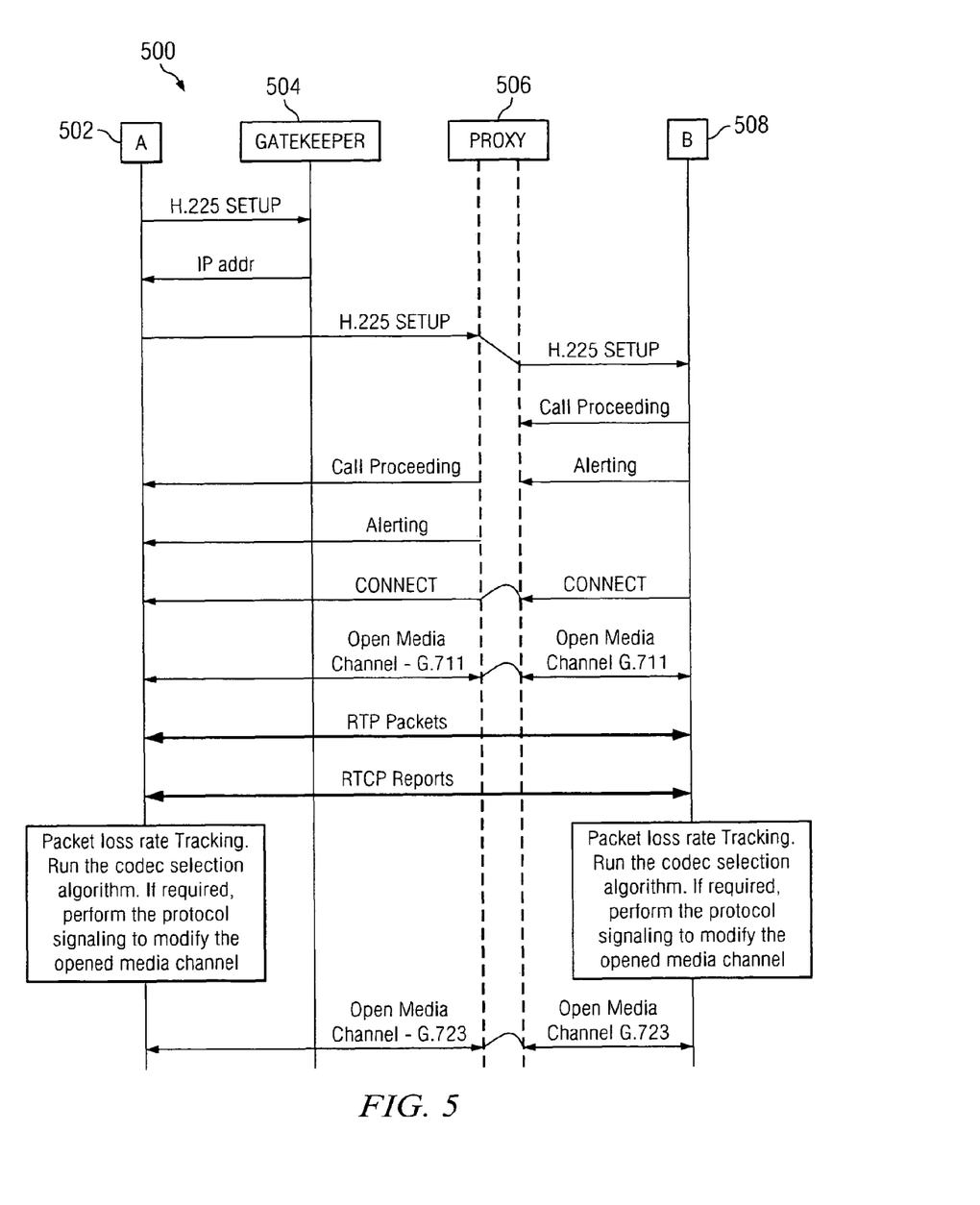
FIG. 5 is a somewhat simplified call flow diagram illustrating exemplary H.323 Protocol Signaling to establish a VoIP Call and to renegotiate the vocoder as per an exemplary Codec Selection Algorithm to enhance Voice Quality according to one embodiment of the present disclosure.

FIG. 5 is a somewhat simplified flow diagram 500 illustrating exemplary H.323 Protocol Signaling to establish a VoIP Call and renegotiating the vocoder as per a Codec Selection Algorithm to enhance Voice Quality according to one embodiment of the present disclosure. For example, FIG. 5 illustrates the message flow for the vocoder renegotiation using the H.323 protocol signaling between Endpoint A 502, gatekeeper 504, proxy 506 and Endpoint B 508. FIG. 5 demonstrates the functionality using H.323 protocol signaling but the signaling protocol is not necessarily a constraint and may be replaced with any VoIP protocol like SIP.

In the example provided in FIG. 5, Endpoint A 502 calls the Endpoint B 508 and sends a "Setup" message to initiate the call. If the "Fast Start" and "H.245 Tunneling" is enabled then the media channel information comprising the vocoder type supported, RTP/RTCP port numbers used would be sent as part of "Setup" message. Endpoint B 508 upon receiving the "Setup" message responds with "Call Proceeding" and "Alerting" message. Also, Incoming_Call callback message is sent to the application to indicate a new incoming call.

Assuming that Endpoint B 508 answers the call and it supports a media channel matching Endpoint A 502, Endpoint B sends a "CONNECT" message with the media channel information comprising the vocoder type supported, RTP/RTCP port numbers used to Endpoint A 502. On receiving "CONNECT" message, both Endpoint A 502 and Endpoint B 508 opens the media channels and bi-directional flow of RTP/RTCP packets is established. During the call, the packet loss rate or the network congestion condition is estimated with the help of the RTCP reports.

Based on the packet loss rate, the appropriate packet loss concealment algorithm or vocoder algorithm is used. Referring to FIG. 2, if the packet loss rate is 10 percent, the current vocoder used in the call is switched to G.723. Similarly, if the packet loss rate is 20 percent, the current vocoder used in the call is switched to G.722, if the system supports wideband codec, or the call is switched to G.729. Only the process discussed in FIG. 4, needs to be implemented in the participating endpoint to accomplish this functionality.

Figure 6:
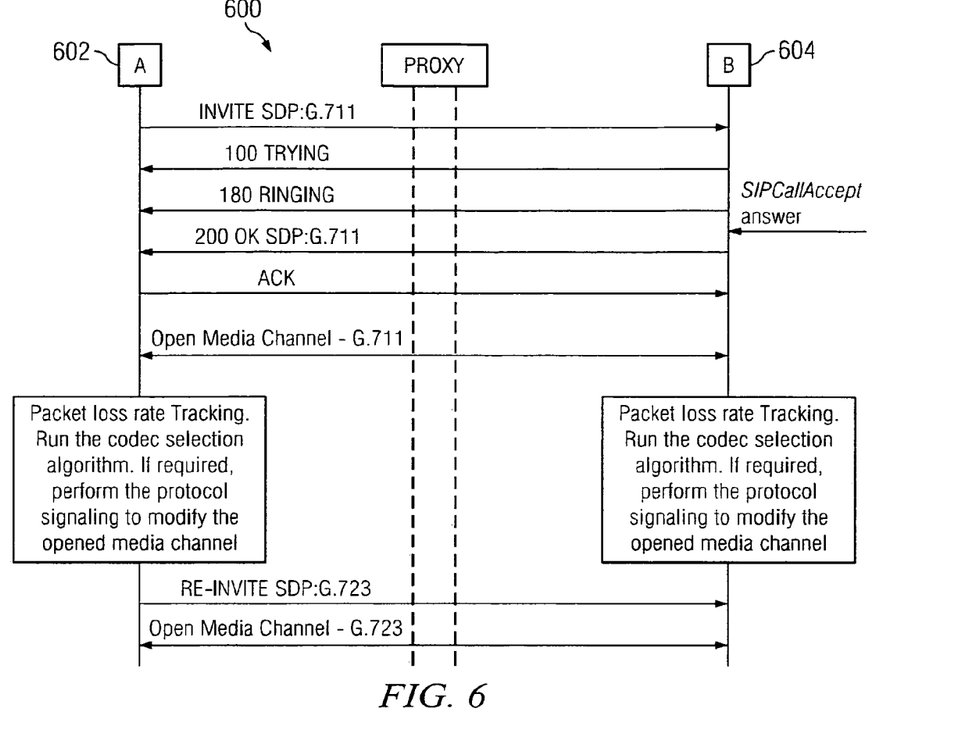
FIG. 6 is a somewhat simplified call flow diagram illustrating SIP Protocol Signaling to establish a VoIP Call and to renegotiate the vocoder as per an exemplary Codec Selection Algorithm to enhance Voice Quality according to one embodiment of the present disclosure.

FIG. 6 is a somewhat simplified flow diagram illustrating SIP Protocol Signaling to establish a VoIP Call and to renegotiate the vocoder as per an exemplary Codec Selection Algorithm to enhance Voice Quality according to one embodiment of the present disclosure. For example, FIG. 6 shows the message flow for the vocoder renegotiation using SIP protocol signaling. This particular example demonstrates the functionality using SIP protocol signaling, but the signaling protocol is not a constraint and can be replaced with any Voice over IP protocol like H.323. In the example provided in FIG. 6, Endpoint A 602 calls the Endpoint B 604 and sends an "Invite" message to initiate the call.

The media channel information comprising the vocoder type supported, RTP/RTCP port numbers used is sent along with the "Invite" message using the Session Description Protocol (SDP). Endpoint B 604 upon receiving the "Invite" message responds with "Trying" and "Ringing" message. Also, Incoming_Call callback message is sent to the application to indicate a new incoming call. Assuming that Endpoint B 604 answers the call and it supports a media channel matching Endpoint A 602, it sends an "OK" message with the media channel information comprising the vocoder type supported, RTP/RTCP port numbers used to Endpoint A 602. On receiving "OK" response, Endpoint A 602 responds with "ACK" and both Endpoint A 602 and Endpoint B 604 opens the matching media channels and bi-directional flow of RTP/RTCP packets is established.

During the call, the packet loss rate or the network congestion condition is estimated with the help of the RTCP reports. Based on the packet loss rate, the appropriate packet loss concealment algorithm or vocoder algorithm is used. Referring to FIG. 2, if the packet loss rate is 10 percent, the current vocoder used in the call is switched to G.723. Similarly, if the packet loss rate is 20 percent, the current vocoder used in the call is switched to G.722, if the system supports wideband codec, or the call is switched to G.729. Accordingly, the process discussed in conjunction with FIG. 4 can be implemented in the participating endpoint to accomplish this functionality.

Figure 7:
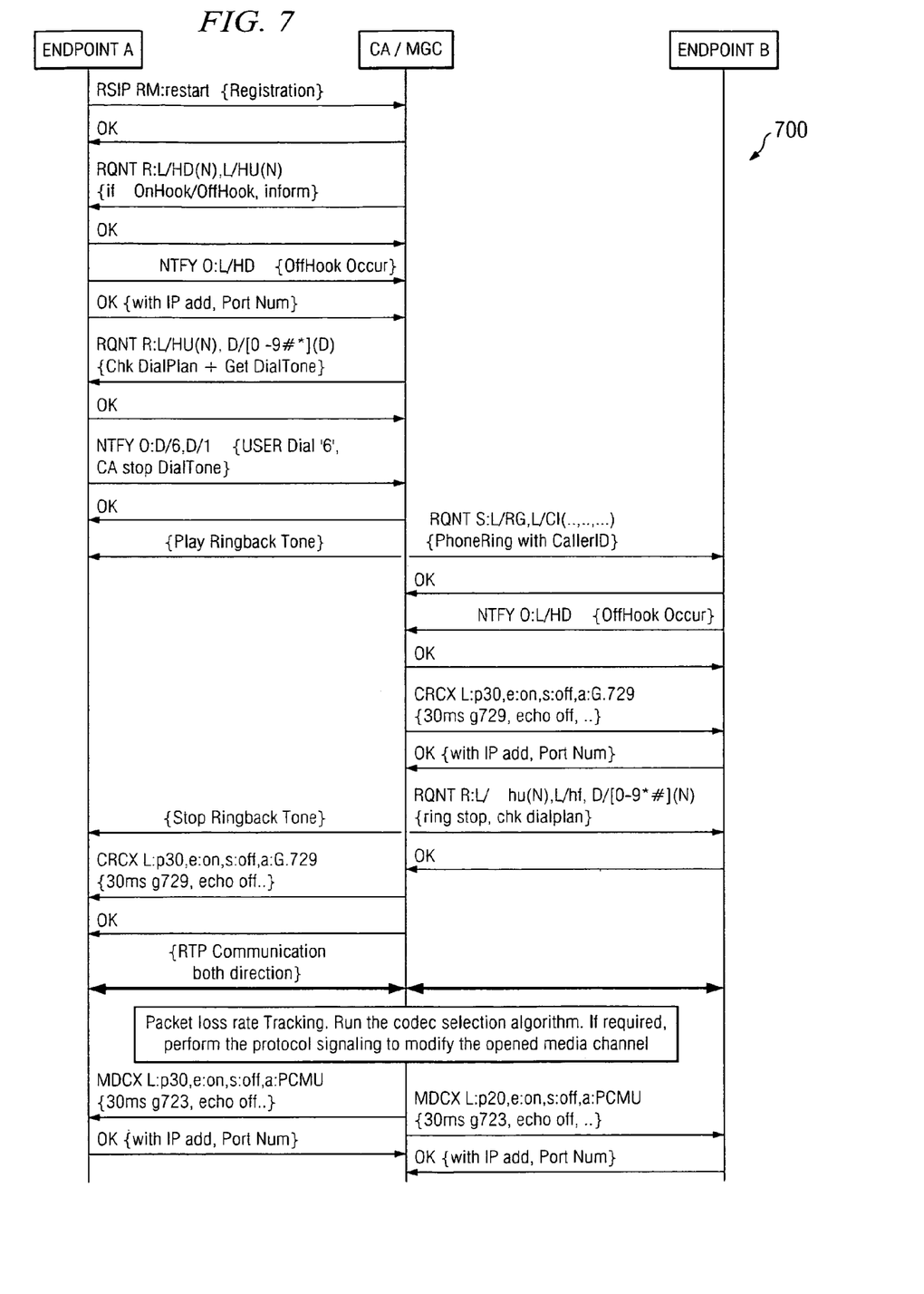
FIG. 7 shows an exemplary message flow for the vocoder renegotiation using MGCP protocol signaling according to one embodiment of the present disclosure.

FIG. 7 shows an exemplary message flow for the vocoder renegotiation using MGCP protocol signaling. This particular example demonstrates the functionality using MGCP protocol signaling, but the signaling protocol is not a constraint and can be replaced with any Voice over IP protocol, including H.323 and others.

In the example illustrated in FIG. 7, the Media Gateway Controller (MGC) or the Call Agent (CA), shown as CA/MGC, requests Endpoint A to notify MGC for the off-hook event. When Endpoint A goes off-hook to make an outgoing call, it informs the off-event to MGC. Upon receiving the off-hook event, MGC requests Endpoint A to play dial tone and key in the outgoing called party phone number, for example of Endpoint B.

After Endpoint A keys in the phone number, MGC informs the Endpoint A to play ring-back tone and asks Endpoint B to play power ringing tone. Assuming Endpoint B answers the call, MGC opens the RTP/RTCP media channels between MGC and Endpoint B. At the same time, MGC asks Endpoint A to open the matching RTP/RTCP media channel vocoder capabilities between MGC and Endpoint A.

At this moment, MGC relays the RTP/RTCP packets from Endpoint B to Endpoint A and from Endpoint A to Endpoint B to establish complete voice call. During the call, the packet loss rate or the network congestion condition is estimated by MGC with the help of the RTCP reports. Based on the packet loss rate, MGC selects the most appropriate packet loss concealment algorithm or vocoder algorithm. As illustrated and described above with relation to FIG. 2, if the packet loss rate is 10 percent, MGC switches the current vocoder used in the call to G.723. Similarly, if the packet loss rate is 20 percent, MGC switches the current vocoder to G.722, if the system supports wideband codec, or it switches the call to G.729. Only a simple rule or algorithm, such as that illustrated and described above with relation to FIG. 4, needs to be implemented in the Call Agent to accomplish this functionality.

In the event that a protocol signal is received from the remote terminal to change the vocoder, then the same Codec Selection enhancement algorithm can be used to either accept the request or to reject the request.

Figure 8:
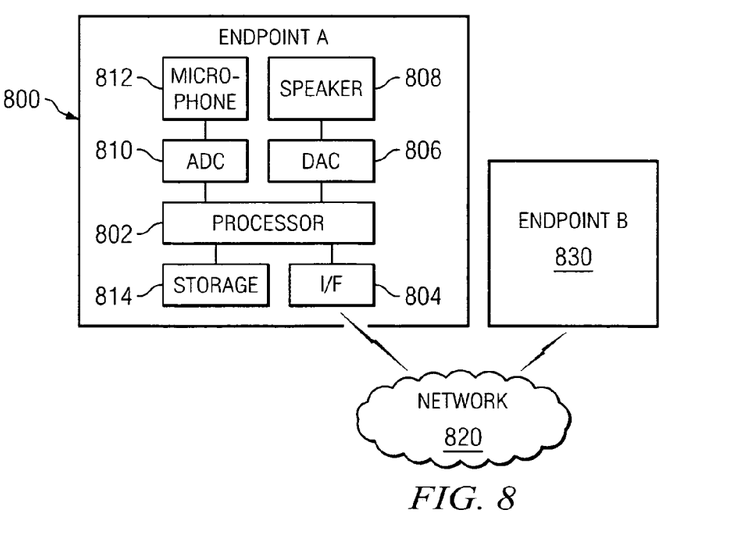
FIG. 8 shows a simplified block diagram of an endpoint device as in some embodiments.

FIG. 8 shows a simplified block diagram of an Endpoint device as in some embodiments. Endpoint A 800, in some embodiments, includes a processor 802 and associated storage 814, which can be implemented as any machine-usable medium. The processor can be configured to operate as described herein, and can execute computer program products and instructions encoded in storage 814.

In some embodiments, Endpoint A 800 includes an analog-to-digital converter (ADC) 810 connected to receive voice input from microphone 812 and convert it for use by processor 802. In some embodiments, Endpoint A 800 includes a digital-to-analog converter (DAC) 806 connected to convert digital data from processor 802 to be output form speaker 808. In other embodiments, Endpoint A does not include the speaker/microphone combinations, but provides connections for an external telephone device that has these features.

Endpoint A also includes interface 804, by which processor 802 can communicate with network 820. The interface 804 can be any known interface, such as a modem for communicating over a telephone system, an Ethernet connection, a serial connection, a wireless connection, or otherwise.

Network 820 can be any public or private data network or combination of them, and is assumed herein to include the necessary communications hardware known to those of skill in the art and not necessary for an understanding of the disclosed embodiments. Gatekeeper 504 and proxy 506 as described above are omitted from this Figure for sake of simplicity, but are included in network 820 in various embodiments. Endpoint B 830, which can be structurally similar to Endpoint A 800, is also connected to communicate with network 820, and to Endpoint A 800 over network 820, as described herein.

In one embodiment, the present disclosure provides a system and method to select the most appropriate voice codec and packet-loss concealment algorithm based on the packet loss conditions. Thus, better voice quality (i.e., a maximum possible PESQ score) for different packet loss conditions is achieved without requiring any special or proprietary protocol signaling to be implemented in the participating VoIP endpoints (other than being compliant with the existing standards i.e., H.323 for an endpoint or SIP for an UA or MGCP for a MGC). In one embodiment, for example, a rule or algorithm, discussed in detail herein in conjunction with FIG. 4, may be used by a participating endpoint to enhance the voice quality in accordance with one embodiment of the present disclosure.

Accordingly, in one embodiment, the present disclosure provides a system and method for H.323 endpoints in H.323 or User Agent (UA) in SIP or Media Gateway Controller (MGC) in MGCP which are used for multimedia transmission, like an IPPhone or an endpoint in a gateway, in a packet network. Specifically, the method describes implementing the algorithm within the framework of H323/SIP/MGCP like call signaling protocol.

One embodiment of the present disclosure may be used in conjunction with multimedia transmission, such as IPPhone or an endpoint in a gateway, in a packet network in voice over IP (VoIP) Gateways or terminals (H.323 endpoints in H.323 or User Agent (UA) in SIP or Media Gateway Controller (MGC) in MGCP).

Embodiments of the present disclosure generally provide a system and method for achieving voice quality in packet-based systems.

In one embodiment, the Speech Codec Selection algorithm of the present disclosure does not require any VoIP endpoint to implement special functions or protocols. For example, the endpoints just make and receive calls as per the existing VoIP standards. In other words, embodiments of the present disclosure may be retrofitted into conventional systems and methods.

In another embodiment, the present disclosure provides a system and method to select the most appropriate voice codec and packet-loss concealment algorithm based on the packet loss conditions. Thus, better voice quality (i.e., a maximum possible PESQ score) is achieved for different packet loss conditions without requiring any special or proprietary protocol signaling at participating VoIP endpoints (other than those required to remain compliant with the existing standards i.e., H.323 for an endpoint or SIP for an UA or MGCP for a MGC).

In still another embodiment, the present disclosure provides a speech codec selection algorithm incorporating every feature shown and described. In yet another embodiment, the present disclosure provides a system incorporating every feature shown and described. In another embodiment, the present disclosure provides a method incorporating every feature shown and described. In yet another embodiment, the present disclosure provides a processing system incorporating every feature shown and described.

Various embodiments includes a system and method for achieving voice quality in packet-based systems is provided using a Speech Codec Selection process. The process does not require any VoIP endpoint to implement special functions or protocols, but can be implemented in an endpoint. For example, in some embodiments, the endpoints just make and receive calls as per the existing VoIP standards. The most appropriate voice codec and packet-loss concealment algorithms are selected by the participating VoIP endpoints based on the packet loss conditions. Accordingly, better voice quality (i.e., a maximum possible PESQ score) for different packet loss conditions is achieved without requiring any special or proprietary protocol signaling to be implemented in the participating VoIP endpoints (other than being compliant with the existing standards i.e., H.323 for an endpoint or SIP for an UA or MGCP for a MGC).

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of improving voice quality in a packet based network, the method comprising:
    receiving an incoming call from a first endpoint;
    matching capabilities between the first endpoint and a second endpoint;
    completing the incoming call if the capabilities match;
    tracking packet loss associated with the network; and
    selecting, based on the matched capabilities and the tracked packet loss, a combination of a Packet Loss Concealment (PLC) algorithm and a vocoder to achieve a maximum possible Perceptual Evaluation of the Speech Quality (PESQ) score.

2. The method of claim 1, wherein the receiving, matching, completing, tracking, and selecting are carried out at the second endpoint.

3. The method of claim 1, wherein the capabilities are vocoder capabilities.

4. The method of claim 1, further comprising negotiating the voice quality based on the tracking and the capabilities, including negotiating the PLC algorithm.

5. The method of claim 1, further comprising sending a Real-time Transport Control Protocol (RTCP) sender report.

6. The method of claim 1, further comprising selecting from a plurality of PLC algorithms and a plurality of vocoders.

7. The method of claim 1, wherein the combination selected changes during the call based on a varied tracked packet loss.

8. An endpoint device, comprising:
    an interface configured to receive an incoming call from a second endpoint device; and
    a processor coupled the interface and configured to:
        compare capabilities with the second endpoint device;
        complete the incoming call if the capabilities match;
        track the packet loss associated with a network; and
        select, based on the matched capabilities and the tracked packet loss, a combination of a Packet Loss Concealment (PLC) algorithm and a vocoder to achieve a maximum possible Perceptual Evaluation of the Speech Quality (PESQ) score.

9. The endpoint device of claim 8, further comprising:
    a speaker, microphone, or a connection for an external telephone.

10. The endpoint device of claim 8, wherein the capabilities are vocoder capabilities.

11. The endpoint device of claim 8, wherein the processor is configured to negotiate voice quality based on the tracking and the capabilities by negotiating the PLC algorithm.

12. The endpoint device of claim 8, wherein the endpoint device is further configured to send a Real-time Transport Control Protocol (RTCP) receiver report.

13. The endpoint device of claim 8, wherein the processor is configured to select from a plurality of PLC algorithms and a plurality of vocoders.

14. The endpoint device of claim 8, wherein the combination selected changes during the call based on a varied tracked packet loss.

15. A system, comprising:
    a first endpoint device configured to:
        communicate over a network with a second endpoint device;
        receive an incoming call from the second endpoint device;
        compare capabilities with the second endpoint device;
        complete the incoming call if the capabilities match;
        track packet loss associated with the network; and
        select, based on the matched capabilities and the tracked packet loss, a combination of a Packet Loss Concealment (PLC) algorithm and a vocoder to achieve a maximum possible Perceptual Evaluation of the Speech Quality (PESQ) score.

16. The system of claim 15, wherein the first endpoint device includes at least a speaker, microphone, or a connection for an external telephone.

17. The system of claim 15, wherein the capabilities are vocoder capabilities.

18. The system of claim 15, wherein the first endpoint is configured to negotiate voice quality based on the tracking and the capabilities by negotiating the PLC algorithm.

19. The system of claim 15, wherein the first endpoint device is further configured to send a Real-time Transport Control Protocol (RTCP) receiver report.

20. The system of claim 15, wherein the first endpoint device is configured to select from a plurality of PLC algorithms and a plurality of vocoders.

21. The system of claim 15, wherein the combination selected changes during the call based on a varied tracked packet loss.

* * * * *